March 14, 1967 A. R. HENSON ET AL 3,308,740
DRAFT-FREE AIR CURTAIN CLOSURE
Filed Jan. 15, 1965 3 Sheets-Sheet 1

INVENTORS
Artel R. Henson, &
BY Andrew J. Gladd

Dale A. Winnie
ATTORNEY

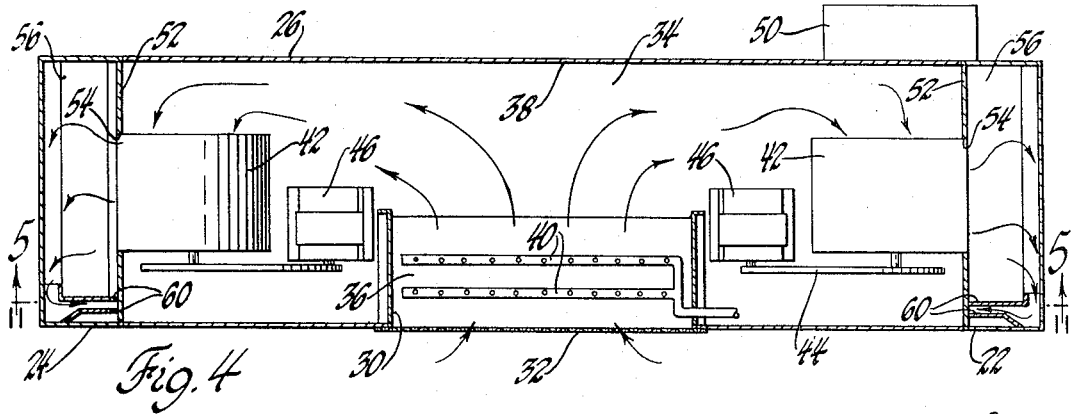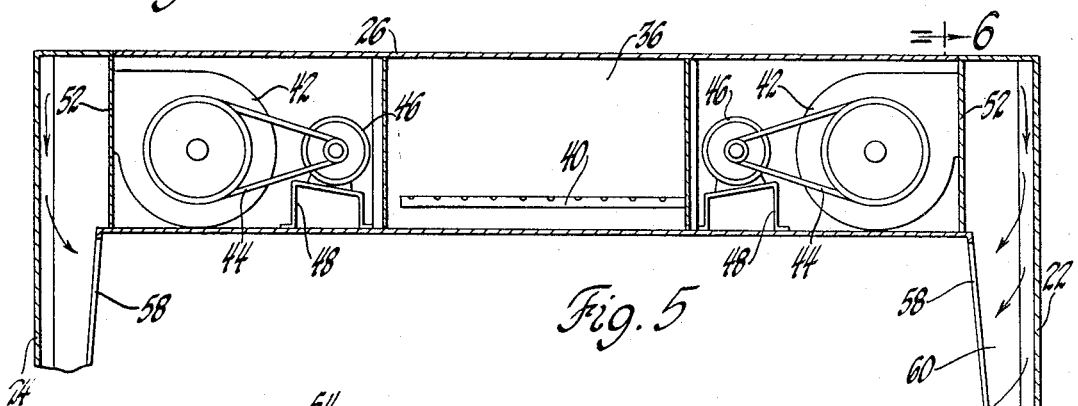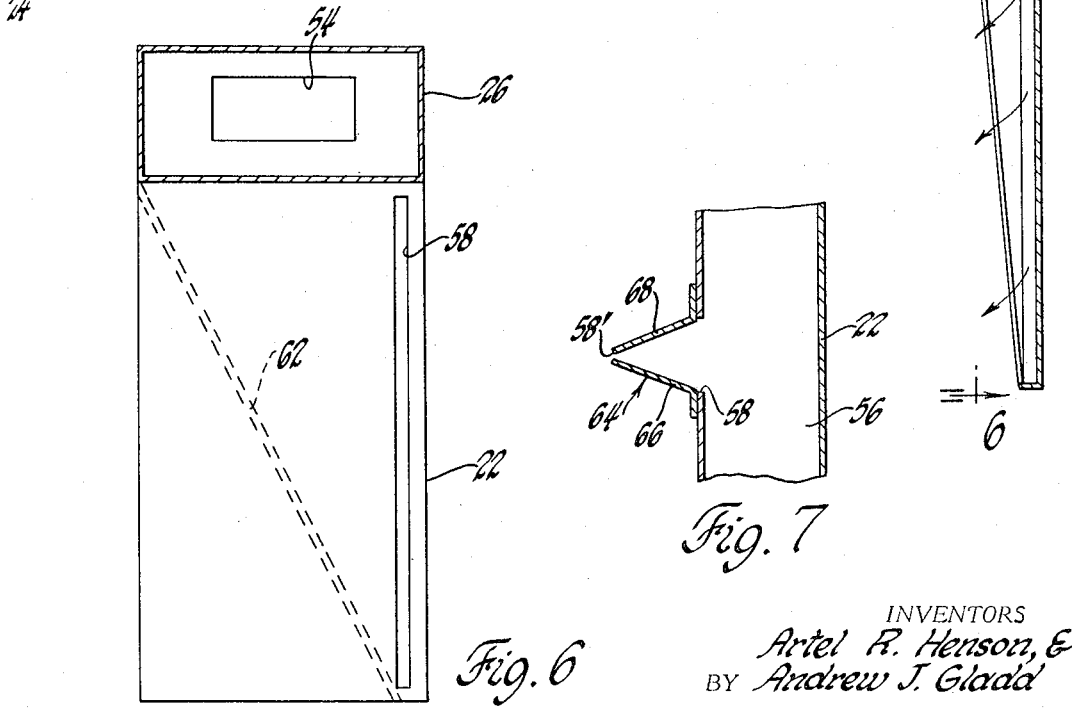

March 14, 1967  A. R. HENSON ET AL  3,308,740
DRAFT-FREE AIR CURTAIN CLOSURE
Filed Jan. 15, 1965  3 Sheets-Sheet 3

INVENTORS
*Artel R. Henson, &*
BY *Andrew J. Gladd*

*Dale A. Winnie*
ATTORNEY

United States Patent Office 3,308,740
Patented Mar. 14, 1967

3,308,740
DRAFT-FREE AIR CURTAIN CLOSURE
Artel R. Henson, Birmingham, and Andrew J. Gladd, Farmington, Mich., assignors to Disco Engineering, Inc., Detroit, Mich., a corporation of Michigan
Filed Jan. 15, 1965, Ser. No. 425,762
2 Claims. (Cl. 98—36)

This invention relates to heating and ventilating equipment in general and more particularly to equipment of this type which uses fresh air and is adapted to provide a draft-free air curtain and to serve other useful purposes.

Car washing establishments and other garage type facilities, which are required to be open almost constantly, are very difficult to heat and ventilate properly. Quite often drafts are created in such buildings and they are more uncomfortable to work in than working outside. Car washing facilities in particular have this problem because they are frequently open at opposite ends and are like a long tunnel through which cold winter winds and hot dusty summer gales pass in great gusts and flurries.

As will be appreciated, in a long open tunnel-like car washing establishment, all of the inside air which has been heated for winter or cooled for summer, is drawn out when a revenging gale passes through or across an open end like the wind draws smoke from a chimney. This means that large expensive overworked heating and ventilating equipment must be installed in a car washing facility and it is therefore part of both the capital investment and the year round overhead operating expense.

It is necessary to adequately heat and ventilate different facilities, like a car wash, for more reasons than are at first obvious.

People are not attracted to uncomfortable places and normally will not return to a cold and drafty or hot and dusty place where they have previously experienced any discomfort. No one likes to go into a place that has beads of condensation running down the walls, frost forming on the windows, or clouds of dust and dirt swirling around. It is bad for the health of those who work in such places, as well as the customers, and lay-offs and absenteeism are frequent. The work, too, can't be performed as well by people that are uncomfortable or that must work under such unfavorable circumstances.

It stands to reason that a car washing facility, in particular, needs the very best of working conditions to be able to keep low cost labor and to do an effective and efficient job. Humidity must be reduced to a minimum and dust must be kept down and completely out if possible, for best car washing performance. Winter snow and ice must be quickly removed and kept from forming or collecting on brushes that beat against the cars and on drying cloths as they become damp through use.

Most large car washing and like establishments use a high production space heater in the winter to replenish lost heat. Usually these space heaters re-use the same inside air over and over and this creates a serious humidity problem. They are also usually forced draft fan arrangements which create pockets of heat and drafts of their own.

In the hot summer weather, very few car wash facilities do anything about the ventilating problem. They may close a door if a dust storm kicks up but usually the workers swelter in the high humidity created by the jet streams of water and water blow-offs of the car washing equipment.

Among the numerous other complaints of inadequately equipped and serviced facilities of the type under discussion, are the inability to remove and/or dispose of ice and snow fast enough, the formation of ice on rails, brushes, etc., continuously damp and cold drying cloths in the winter, steam cloud formations, dust seepage, rust accumulation, and problems of inadequate insulation in some of the older buildings.

It is an object of this invention to disclose a new and different heating and ventilating system and one particularly suited for use in car washes and like garage type establishments which are frequently open.

It is an object of this invention to disclose an outside air inductive piece of equipment which can be used to supplement existing heating and ventilating equipment.

It is an object of this invention to disclose a forced air heating and ventilating system capable of providing a protective air curtain across an opening and of pressurizing the building in which it is provided.

It is an object of this invention to provide a self-contained fresh air inductive heating and ventilating piece of equipment having supporting members formed to include plenum chambers and arranged to exhaust properly conditioned air across an opening and under pressure for creating a protective air curtain for excluding undesirable and inclement weather.

In one form of the present invention a self-contained unit is provided which may be located just inside and behind a door opening to provide an air curtain across the opening when the door is opened. Fresh air is drawn into the unit through the open door and is exhausted through the legs of the unit across the door opening.

Special effects and advantages are obtained in having the air curtain air-exhausted near the front, back and diagonally across the supporting units legs and although a free-standing unit is preferred, a hanging unit and those requiring some installation are also shown and disclosed.

Numerous objects and advantages to be gained in the practice of this invention will be better known and appreciated following a reading of the following specification having reference to the accompanying drawings and wherein:

FIGURE 4 is an enlarged cross-sectional plan view, taken in the plane of line 4—4 of FIGURE 1 looking in the direction of the arrows, showing the air conditioning chamber of the disclosed air curtain closure means.

FIGURE 5 is a cross-sectioned elevational view of the same unit taken in the plane of line 5—5 of the last mentioned drawing figure and looking in the direction of the arrows.

FIGURE 6 is a cross-sectioned view through one end of the overhead induction chamber area and showing the inner face of one of the plenum chamber legs; as seen in the plane of line 6—6 from the last mentioned drawing figure.

FIGURE 7 is a cross-sectional view of a modified form of plenum chamber leg and exhaust part.

Figure 1:
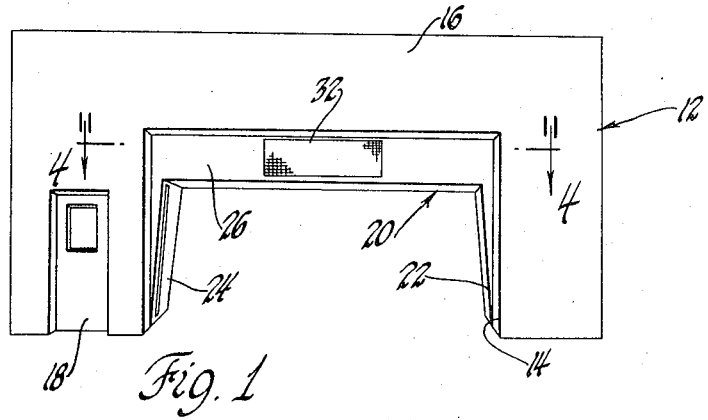
FIGURE 1 is a front perspective of a building having the air curtain means of this invention shown in the open doorway thereof.

Having reference to the drawings in greater detail:

A building 12 is shown with an opening 14 provided through one of its end walls 16. The opening is large enough for passenger car vehicles to pass through it; as is made more obvious by the normal size doorway 18 shown right next to it.

In the building 12, just inside the vehicle passage opening 14, is provided one of the air door or curtain providing devices 20 of this invention.

The air door or curtain providing device 20 is made of sheet metal and is formed to include a pair of legs 22 and 24. The legs are spaced apart and straddle the opening 16 while supporting an overhead transversely disposed connecting part 26 therebetween. The latter may be wholly or only partially visible across the top of the vehicle passageway opening 14, depending on the heighth of the opening 14 in the building 12. However, as will be appreciated, it must be at a heighth to allow cars to pass under it, or trucks and other vehicles.

It should also be appreciated that the air door devices 20 of this invention are not intended to take the place of regular door closures, in the normal sense, and that they are to stand sufficiently behind and inside the passageway openings 14 to allow the regular doors to be closed in front of them, or outside and in front of the regular door closure.

Although a single air door device 20 may be used alone and by itself, in some instances, and with most of the advantages of multiple unit installations, the more typical installations, and particularly for car washes, is to use two or more units with one provided at each building entrance and exit. Such an installation is shown by FIGURE 2.

Figure 2:
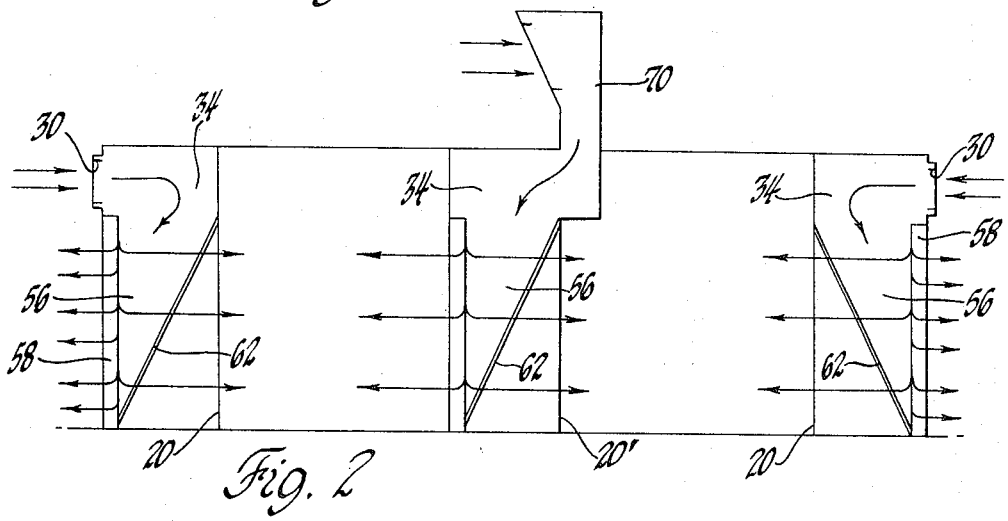
FIGURE 2 is a cross-sectional and diagrammatic view of a series of air circulating and conditioning means arranged in accord with the teachings of this invention.

In FIGURE 2 the terminal air door units 20 are supplemented by an intermediate unit 20′ which is slightly different in construction and serves a different purpose than the two end units. However, it functions very similar to the terminal or end units 30.

Before proceeding, a more detailed description of the air door devices 20 would seem in order.

The overhead or upper transverse part 26 of the air door or curtain devices 20 is formed to provide an internal chamber area 34. It also has an opening 30, covered by a screen 32, through its outer air side wall for the induction of fresh outside air therein.

Within the central chamber space 34 is provided a passageway 36, formed of sheet metal, which extends from the access opening 30 towards the back wall 38 but is spaced apart therefrom. This is to direct incoming air towards the back wall 38 from where it is baffled and flows toward the opposite ends of the central chamber space 34.

Within the passageway 36 may be provided a gas jet, electrical or other heater means 40 to warm and precondition the outside fresh air inducted into the air curtain or door device 20.

Sizable centrifugal type or other fans 42 are provided within the chamber space 34 near each end thereof and are connected by belt drive means 44 to suitable drive motors 46. The drive motors are in turn mounted on fixed or other suitable type mounting stands 48 provided expressly for such purpose.

A control box 50 may be provided on the back of the air door devices 20 to include suitable switch and control devices for the motors 46, heater means 40 and the like. Since the need and use of such control means are readily understood and appreciated, the control box 50 is shown only in FIGURE 4 and only in diagrammatic box outline form.

The chamber space 34 within the overhead transverse part 36 of the air door device is closed by end walls 52 which are cut to include openings 54 matching and receiving the outlets of the fans 42 so that their exhaust is directed therethrough.

Large centrifugal type fans 42 are preferred and two such fans provide a more balanced system. However, it will be appreciated that one single fan might be used in certain air door units. The principal thing is to be able to move a large volume of air through the chamber space 34 and into the supporting legs 22 and 24, as is about to be described. In this regard, it will be appreciated that the size of the inlet opening 30 to the chamber space, the capacity of the fan units 52 and the size of the outlet openings 54 from the chamber space 34 should all be taken into consideration.

Referring now to the supporting legs 22 and 24 of the air door devices:

Since the chamber supporting legs 22 and 24 are essentially the same, reference will be made to only one in describing their like structure. In this respect, each includes a plenum chamber space 56 which is receptive of air that is introduced therein by the fans 42. The inducted air is heated at least in winter, and therefor dehumidified and is under modest pressure.

The air in the plenum chamber spaces 56 within the legs 22 and 24 is exhausted through slots 58 which extend the full length of the supporting legs and are open on the inner and adjacently disposed side walls of the legs so that the air passing therethrough is directed between the legs to provide an air door or curtain from whence the units get their name.

The supporting legs 22 and 24 are shown as tapered towards their lower terminal ends. They are essentially the same width throughout their height but the inner side walls are slanted so that the chamber space therewithin is smaller, or of less capacity, near the bottom, and the exhaust pressure throughout the length of the legs will therefor be more constant. To further facilitate a more constant exhaust pressure, exhaust nozzle forming passage walls 60 are provided just behind the exhaust slots 58. Furthermore, a baffle wall 62 may be provided within the plenum chamber spaces 56 diagonally across the legs to further reduce the air volume space at the lower ends of the legs.

Referring to FIGURE 7, the exhaust slot and nozzle effect, and control of the air pressure exhaust from the air curtain legs 22 and 24, may be obtained in the use of exhaust slot and nozzle forming means 64 provided externally of the exhaust port 58. Such means may include a pair of suitably formed sheet metal parts 66 and 68 which are secured to the outside of the supporting legs over a like or enlarged exhaust slot 58 communicating directly with the plenum chamber space 56. By being suitably formed to converge together, the nozzle forming sheet metal part 66 and 68 can be made to provide a smaller and more readily controlled exhaust slot 58′ which may be of minimal width throughout the length of the legs for greater directional and exhaust pressure control thereof.

It will also be appreciated that this type of an arrangement may enable the width of the exhaust slot 58′ to be varied throughout the heighth of the leg to correct any static flow conditions as a result of the fixed construction of the other sheet metal parts.

Figure 3:
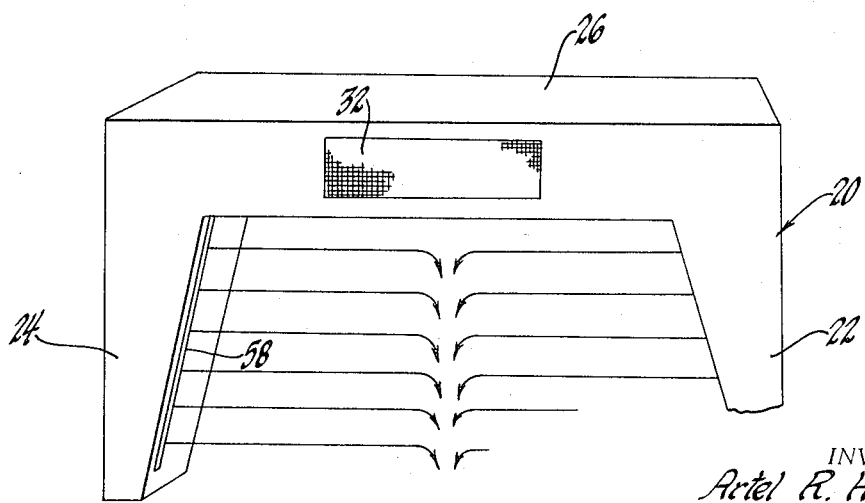
FIGURE 3 is a perspective view of a free-standing unit for providing an air curtain screen across an opening and showing the air current flow into and out of the unit.

Referring now back to FIGURE 3:

The supporting legs 22 and 24 of the air curtain device 20 are so formed and constructed either as to external shape or by internal baffling, so as to provide an air curtain flow as shown by the arrows between the supporting legs 22 and 24. The air flow converges centrally and flows in a large part outwardly; that is, except as necessary to maintain a given pressure condition in the building 12 within which the air curtain device is provided.

The taper of the supporting legs 22 and 24 is exaggerated for emphasis in the different drawings and is really not too pronounced. With the use of internal baffles and progressive restriction of the exhaust slot they could be made straight. However, as regards the outwardly tapering legs, it will be appreciated that in a car washing shop the continuous travel of vehicles through the air curtain devices fills, in a large part, the space between the legs and so either requires less pressure or less taper at the lower terminal ends. In all, it can be seen that the system can be balanced in many ways and all such ways are contemplated hereby.

Referring back to FIGURE 2, two end or terminal disposed air curtain devices 20 are shown at opposite ends of the building 12 with a third unit 20' disposed between them and having an outside air scoop intake 70 through the roof of the building for the induction of fresh outside air. The intermediate unit 20' is for blower dry-off in a car washing line and also for balance in a system which is used in a building that is longer than most.

In a two or three unit system, the two end units 20 will take outside fresh air into their overhead chamber spaces 34, through the screen covered openings 30 and will pass the air, under pressure, into the plenum chamber spaces 56 in the supporting legs. From the supporting legs the air is exhausted through the slots 58 and, as previously mentioned, in an operating unit it will be caused to flow principally outwardly. Initially, some of the air will flow from each unit into the building until sufficient pressure is built up between the two terminal units 20 to maintain a head of pressure in the building. This pressure condition within the building will prevent cold air drafts in the building, the induction of outside air through cracks and crevices or open doors, and air-tunnel gusts or the like through the building at any and all times.

There is essentially no air loss by vehicle travel through the air door devices 20 since a vehicle entering the building 12 will displace a certain amount of air and as it passes through the air door device 20 at the terminal opening it will deflect sufficient air flow back into the building to replenish the amount of air initially displaced.

Air flow across the building openings 16 does not draw air from the building, as might be expected, since there is an adequate supply of air being buffeted and directed inwardly to replenish any draw-off flow. Similarly, the air flowing from each end of the building, into the building, converges centrally and flows out towards the side walls in large slow moving swirls rather than draft-forming floor sweeping gusts.

Air movement is largely reduced in the building by equalizing the air exhaust pressure between the top and bottom of the air curtain means. This reduces floor to ceiling flow and like draft currents and creates a slow massive movement for good circulation, constant air temperature pressurization sufficient to preclude window drafts, and such, but without the normal adverse effects.

The intermediate unit 20' shown in FIGURE 2, shows air flow would be about the same in both directions with the conventional type air door devices spaced on each side thereof. However, given different or varying conditions, it will be appreciated that the middle unit helps preserve the conditions at one end of the building while providing a means for faster recovery at the other end thereof.

The advantages of the free-standing units 20, as will be obvious, are that no installation problems are involved in their use. They are simply erected near an access opening, just inside or out, and are connected to a power supply source for the fan motors and the same for the heaters or gas flame unit, if used. Since the air door members are not permanent fixtures, in the normally accepted sense, the cost of financing thereof may be also treated differently.

Figure 8:
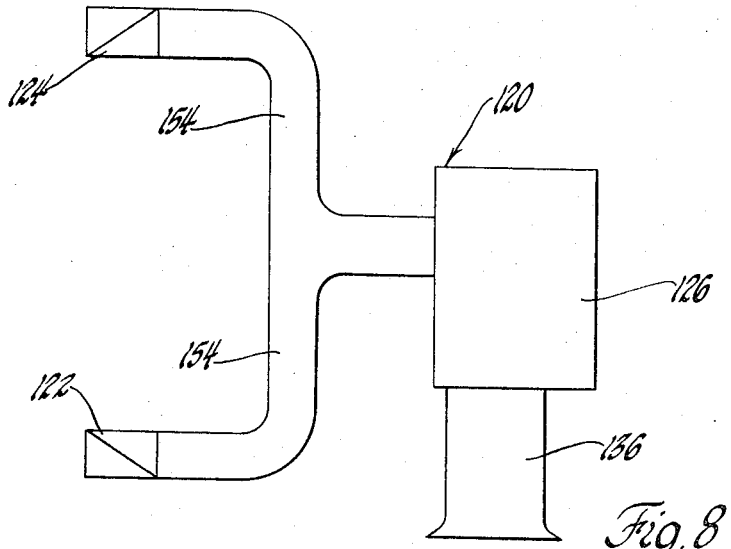
FIGURE 8 is a plan view of another type of air curtain device; in this instance, one which is supported from overhead and has a side wall inductive passage.
Figure 9:
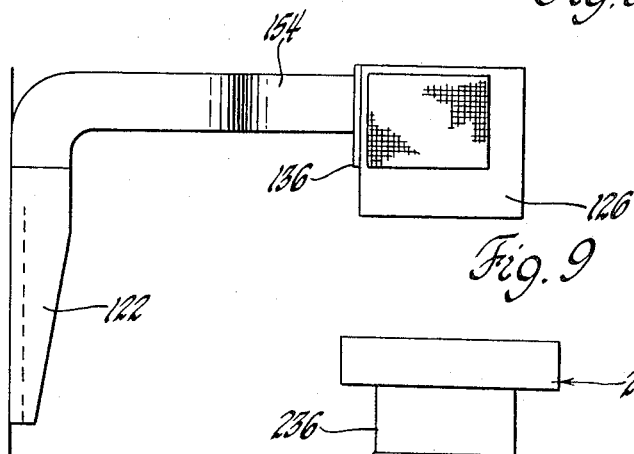
FIGURE 9 is a side elevational view of the last mentioned air curtain device.
Figure 10:
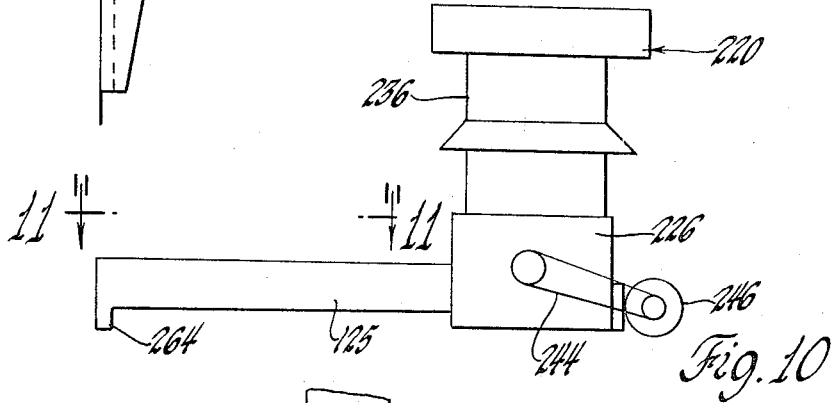
FIGURE 10 is an elevational view of another air circulating and conditioning piece of equipment.

The fact that a free-standing unit is preferred and has certain advantages, is not to be taken to discount use of many of the proposals set forth in a hanging unit or a full overhead unit such as is shown by FIGURES 8–10.

FIGURES 8 and 9 show a hanging unit 120 which has a centrally disposed air collecting and conditioning chamber member 126 with a passage member 136 for extending through a side wall of a building to get fresh air. Outwardly disposed ducts 154 communicate with depending member 122 and 124 which are formed to extend down beside a building entrance or exit opening, on opposite sides of it, and provide an air curtain thereacross. They are tapered or otherwise formed to serve the purpose and accomplished the objectives of the free-standing legs 22 and 24 of the unit 20 previously described.

Figure 11:
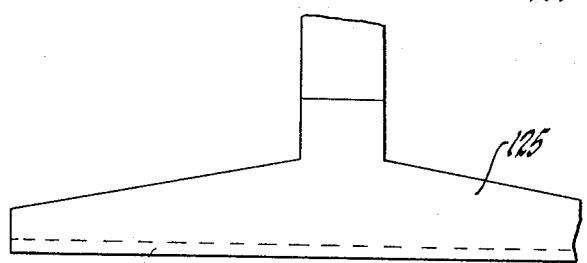
FIGURE 11 is a plan view of a part of the last mentioned piece of equipment, as seen in the plane of line 11—11 on the last drawing figure.

FIGURES 10 and 11 show a hanging unit 220 which has a passage forming part 236 that would extend through, over, and above the roof line of a building, to draw in outside air, and which connects to the air conditioning chamber part 226. The exhaust flow in this instance is shown as to a single overhead plenum chamber member 125 which is tapered towards its outer ends to provide the lesser capacity and greater pressure near its end, for a uniform air curtain exhaust, as with the previously described units.

The overhead unit 220 is shown to have an externally mounted motor unit 246 with a belt 244 to a forced air fan and inside the chamber space 226. It also has an overhead exhausting nozzle 264 which would direct the conditioned air in a curtain forming screen downwardly therefrom.

From the foregoing discussion, in the description of a few different type air door devices, and their use in different combinations, it will be appreciated that numerous other variations are conceivable and many modifications and improvements come readily to mind. Since these cannot all be set forth, the teachings of this invention are to be given the greatest attention and importance and the hereinafter appended claims are not to be limited except as specifically provided therein.

The air door or curtain means 20 are constructed for knockdown shipment, easy assembly and installation. They are built or fabricated to meet certain basic needs and requirements and to serve a long and purposeful life. They are relatively service-free but, at the same time, are easy to service if necessary.

The large volume of air moved by the air door devices 20, means large passageways and chambers which will not become obstructed or clogged by the collection of dust, bits of paper or the like. Further, the tortuous passage of the air flow assures the separation of all extraneous matter from the air flow long before its final exhaust.

The air pressure build up in a building having a pair of these air door devices, is not appreciable and is not even perceptive to persons working in the building or passing through. It is just enough to prevent cold air drafts from entering the building and air flow through as previously stressed.

The use of fresh outside air and the heating or other pre-conditioning of it, assures air of a lower humidity and a replenishment supply from a different source. Otherwise, in drawing off air from the building in which the units are provided would create undue drafts, require equipment of greater capacity, and would have many other disadvantages.

In winter weather the use of outside air also serves to supplement air lost in exhaust gas carry-offs and means used to lower or reduce humidity. By heating the inducted air not only are the entrances protected by a blanket of warm air but building heat is conserved and the existing winter heating facilities, which are seldom adequate, are notably supplemented.

For best operation, one of the proposed units located just inside or immediately outside, a car wash entrance, with the exhaust slot disposed centrally, or on the inner disposed side edge, so that there is still a protective outer disposed duct wall, or a building wall, will provide a pocket of air that serves as a door closure, flows inward as necessary to replenish air exhausted from the building in normal course, pressurizes the building, preserves the heated condition of the building and pre-heats and conditions cars for washing in winter weather.

A center unit should have the exhaust slot disposed diagonally, and preferably against the direction of vehicle travel, for blower dry-off purposes, as well as the other purposes mentioned.

At the exit way from the car wash, a third unit should be provided and it should be like and located similar to the unit at the entrance way. It serves a similar purpose and works together with the other units, as has been mentioned. It is a final dryer blow-off and serves to provide the air displaced by the vehicle leaving a building.

From the foregoing description of a preferred embodiment of this invention, and a few variations thereof, it will be appreciated that other modifications and improvements are conceivable and are intended to be encompassed within the spirit and scope of the overall invention presented. Accordingly, no limitation beyond those specifically recited by the language of the hereinafter appending claims is to be interpreted as present therewithin.

We claim:
1. In car wash buildings and like work spaces where open access for vehicular and other travel is desirable, the exclusion of inclement weather and drafts through said open access to such work spaces is necessary, and a relatively continuous extrication of waste and work product air from the work space is important to personal health and safety, the improvement comprising;
   an air curtain structure received and mounted in contiguous relation to a doorway access to a work space,
   said air curtain structure including a plenum chamber part extending over and across said access and having ducts connected thereto and disposed in close fitted relation along adjacent sides of said access,
   a fresh air intake opening provided in the outer disposed side face of said plenum chamber part,
   discharge openings provided in said ducts relatively aligned across said access for providing curtain air from each thereof flowing transversely across said access,
   said intake opening being disposed apart from said discharge openings to preclude the recirculation of curtain air,
   means within said plenum chamber part for atmospherically conditioning fresh air received through said intake opening for subsequent use in said work space,
   blower means provided in said air curtain structure for inducting fresh air through said intake opening and distributing conditioned air to said ducts in sufficient volume for discharge under pressure across and in the plane of said access providing an air curtain sealing said access and for deflection within said work space at least in part therebehind,
   said blower having sufficient capacity for providing make-up air in said work space more than compensating for the extrication of waste and other air for pressurizing said work space to back-up said air curtain and preclude drafts and the like therethrough.

2. The method of providing unobstructed traffic flow to and from a work space requiring relatively continuous extrication of waste air, heating and like internal atmospheric conditioning and the exclusion of inclement weather and drafts through open accesses and the like thereto, comprising;
   inducting fresh air from outside the work space and near a traffic access to be left open thereto,
   collecting said fresh air and heating and conditioning it for use in said work space,
   discharging conditioned air from relatively opposite sides of said access and transversely thereof for providing an air curtain closure in the plane of and sealing such access,
   discharging a sufficient volume of heated and conditioned air across said access and into said work space for more than compensating for extricated waste air and pressurizing said work space behind said air curtain closure for reinforcement thereof against inclement weather drafts and the like, and locating the fresh air intake apart from the air curtain discharge and the discharge within the confines of the access for precluding recirculation therebetween.

References Cited by the Examiner

UNITED STATES PATENTS

| | | | |
|---|---|---|---|
| 2,955,521 | 10/1960 | Kurek | 98—36 |
| 3,190,207 | 6/1965 | Weisz | 98—36 |
| 3,207,056 | 9/1965 | Flebu | 98—36 |
| 3,211,077 | 10/1965 | Kramer | 98—36 |
| 3,218,952 | 11/1965 | Gygax | 98—36 |

FOREIGN PATENTS

| | | |
|---|---|---|
| 965,461 | 7/1964 | Great Britain. |
| 567,039 | 9/1957 | Italy. |

ROBERT A. O'LEARY, *Primary Examiner.*

W. E. WAYNER, *Assistant Examiner.*